(12) United States Patent
Marsal et al.

(10) Patent No.: US 9,121,304 B2
(45) Date of Patent: Sep. 1, 2015

(54) OUTER RACE LOCATING WASHER

(75) Inventors: Damien Marsal, Golbey (FR); Raphael Hettinger, La Baffe (FR); Raphael Boileau, Thaon les Vosges (FR); Lionel Toussaint, Gerardmer (FR)

(73) Assignee: Honeywell International Inc., Morristown, NJ (US)

( * ) Notice: Subject to any disclaimer, the term of this patent is extended or adjusted under 35 U.S.C. 154(b) by 374 days.

(21) Appl. No.: 13/609,791

(22) Filed: Sep. 11, 2012

(65) Prior Publication Data

US 2014/0069094 A1   Mar. 13, 2014

(51) Int. Cl.
| F04D 29/059 | (2006.01) |
| F01D 25/16 | (2006.01) |
| F02C 6/12 | (2006.01) |
| F02C 7/06 | (2006.01) |

(52) U.S. Cl.
CPC .............. F01D 25/162 (2013.01); F02C 6/12 (2013.01); F02C 7/06 (2013.01); F05D 2220/40 (2013.01); F05D 2240/50 (2013.01); F05D 2260/30 (2013.01)

(58) Field of Classification Search
CPC ............ F01D 25/162; F02C 7/06; F02C 6/12; F05D 2220/40; F05D 2240/50; F05D 2260/30; F05D 2240/54
USPC .................... 417/406, 407, 408, 409; 415/229
See application file for complete search history.

(56) References Cited

U.S. PATENT DOCUMENTS

| 2003/0008749 A1* | 1/2003 | Mori ............................. 476/40 |
| 2005/0287018 A1 | 12/2005 | Mavrosakis |
| 2011/0052429 A1* | 3/2011 | Marsal et al. ................. 417/407 |

FOREIGN PATENT DOCUMENTS

| DE | 3601082 A1 | 7/1987 |
| EP | 0286883 A1 | 10/1988 |
| EP | 0440917 A1 | 8/1991 |
| EP | 1705393 A1 | 9/2006 |
| EP | 2299066 A2 | 3/2011 |

OTHER PUBLICATIONS

European Patent Office European Search Report for EP Appl. No. 10172408.6-2321 / EP2299066 (Marsal et al.) of Feb. 3, 2012 (3 pages).
European Patent Office Communications for 3rd Party Observations as to EP Appl. No. 10172408.6-2321 / EP2299066 (Marsal et al.) of Nov. 18, 2011 and Oct. 31, 2011 (36 pages).

* cited by examiner

Primary Examiner — Bryan Lettman
(74) Attorney, Agent, or Firm — Brian J. Pangrle

(57) ABSTRACT

An assembly for a turbocharger can include a locating washer having an axis and a perimeter that includes a chord segment defined by an apothem measured from the axis; a bearing assembly that includes an outer race having an axis and a perimeter that includes a chord segment defined by an apothem measured from the axis; and a housing that includes a bore for receipt of the bearing assembly and a recess for receipt of the locating washer to space apart the axes of the locating washer and the outer race by a distance greater than the sum of the apothems that provides for contact between the chord segments upon rotation of at least one of the locating washer in the recess and the outer race in the bore. Various other examples of devices, assemblies, systems, methods, etc., are also disclosed.

18 Claims, 9 Drawing Sheets

OUTER RACE LOCATING WASHER

TECHNICAL FIELD

Subject matter disclosed herein relates generally to turbomachinery for internal combustion engines and, in particular, to locating mechanisms for bearing assemblies.

BACKGROUND

A turbocharger center housing rotating assembly (CHRA) can include a turbine wheel and a compressor wheel attached to a shaft rotatably supported by a bearing assembly located in a bore of a center housing. A bearing assembly or bearing cartridge can include an outer race and an inner race, configured to receive a shaft, where the outer race and the inner race are separated by rolling elements such as ball bearings.

In various CHRAs, a so-called "locating mechanism" restricts movement of a bearing assembly in the bore of the center housing. A locating mechanism may rely on radial insertion of a locating pin in an opening of an outer race of a bearing assembly. Such a mechanism restricts radial and/or axial movement of the bearing assembly and rotation of the outer race yet allows the inner race to spin freely. Additionally, such a mechanism allows for some radial movement of a bearing assembly, usually within defined clearances that fill with lubricant during operation to form a "squeeze film" that acts to damp vibration and noise. In such a CHRA, the degrees of radial and axial freedom may be chosen to be of particular magnitude or magnitudes depending on various goals.

Various issues can arise with locating mechanisms that rely on a radial locating pin to locate a bearing assembly. For example, during operation of a turbocharger, significant axial loads can be generated that thrust the turbocharger shaft and associated components toward the compressor end or toward the turbine end of the turbocharger CHRA, which, in turn, can be transferred from the bearing assembly to the radial locating pin. Another issue pertains to axial stack-up of components (e.g., how well do the components of a CHRA stack and how does this stacking affect operation and wear).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
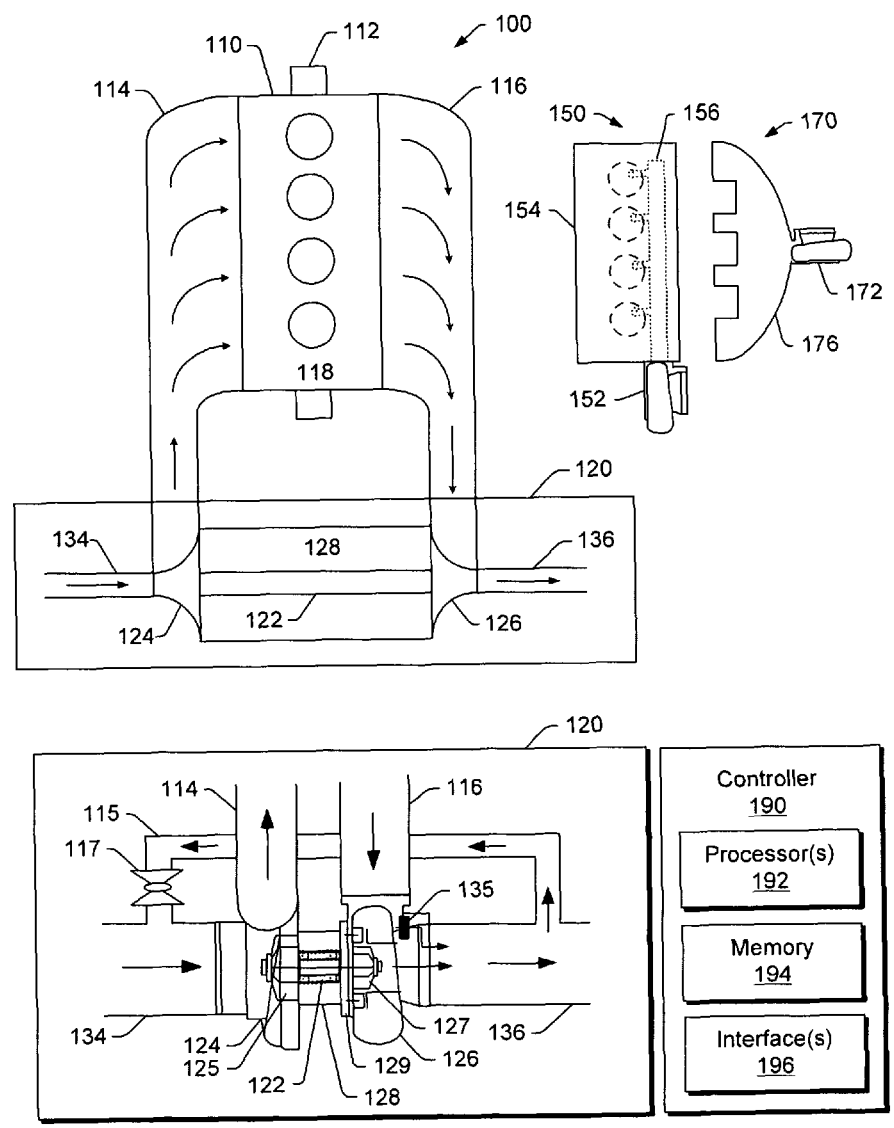
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing assembly (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine 126. The wastegate valve 135 can be controlled to allow at least some exhaust from the exhaust port 116 to bypass the turbine 126. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc., and be operatively connected to a center housing such as the center housing 128.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc.

Figure 2:
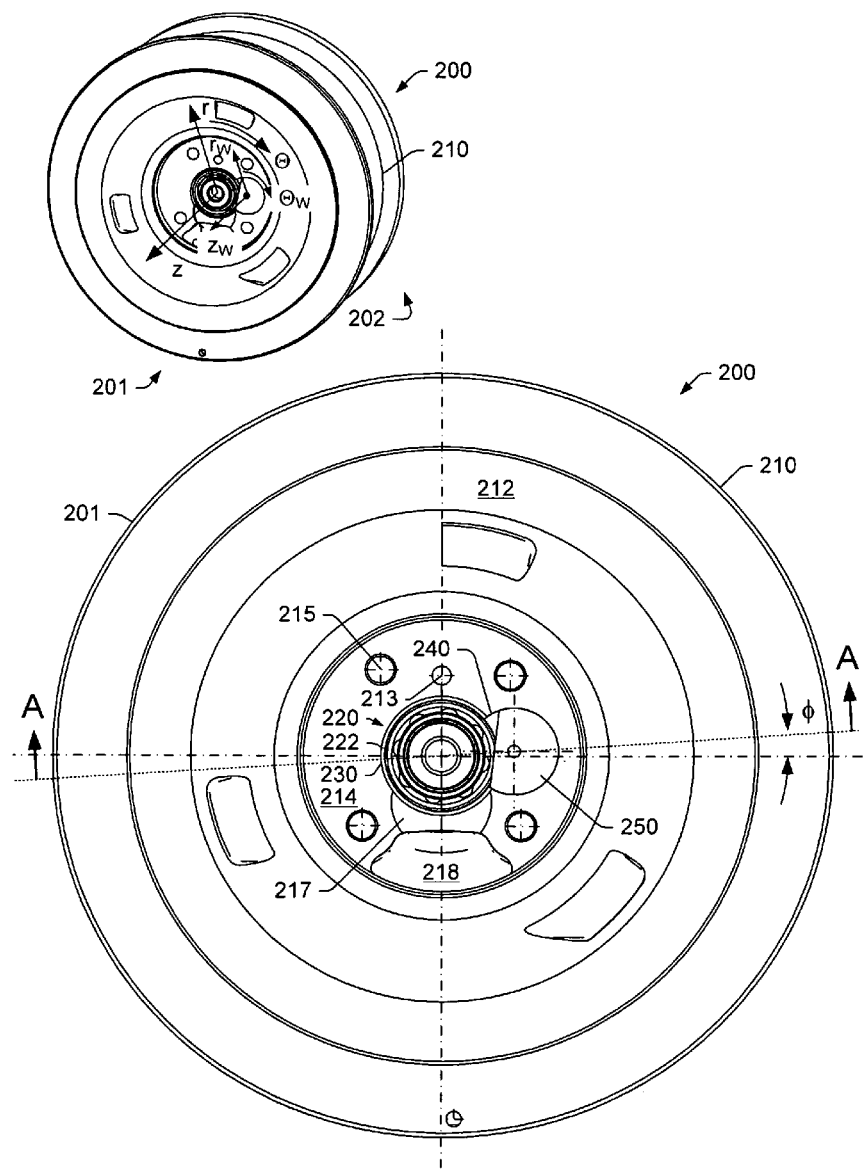
FIG. 2 is a perspective view and an end view of an example of a housing assembly.

FIG. 2 shows an example of a housing assembly 200 as including a housing 210 having a compressor end 201 and a turbine end 202. The housing assembly 200 may be defined, for example, with respect to a cylindrical coordinate system. As an example, a z-axis may be defined along a rotational axis for a shaft extending from a turbine wheel, an r-axis may be defined as extending radially from the z-axis and an azimuthal angle Θ may be defined as an angle from 0 to 360 degrees about the z-axis. Optionally, one or more additional coordinate systems may be used to describe features, for example, another cylindrical coordinate system may be defined to describe a recess for a locating washer or defined to describe the locating washer. As an example, one coordinate system may be defined for an outer race of a bearing assembly while another coordinate system may be defined for a locating washer that can interact with the outer race to limit its rotation. In the example of FIG. 2, two cylindrical coordinate systems are shown, one defined for describing an outer race of a bearing assembly (r, z, Θ) and another defined for describing a locating washer ($r_W$, $z_W$, $Θ_W$) where the z-axes can be offset by a distance (e.g., as defined by features of a housing), which may, for example, be defined in part by an angle φ (e.g., for a hypotenuse of a triangle extending between the z-axes). As an example, the distance between z-axes may be defined by an apothem of an outer race, an apothem of a locating washer and a clearance or gap. In such an example, the clearance or gap may determine one or more rotational limits for the outer race and the locating washer.

As an example, in operation, an outer race may rotate about its z-axis (z) (e.g., clockwise or counter-clockwise) and a locating washer may, in response to being contacted by the outer race, rotate about its z-axis ($z_W$) (e.g., clockwise or counter-clockwise). In such an example, static rotated positions for the outer race and the locating washer may be achieved where static force is distributed to a housing that includes a recess that seats the locating washer (e.g., where a surface or wall of the housing defines the recess and force is transferred to the housing via contact between a locating washer and the surface or wall). As to operational dynamics, the static configuration that distributes force may be achieved in a relatively smooth manner, for example, without excessive "hammering" between surfaces (e.g., outer race, locating washer, housing), which could lead to damage, wear, debris, etc. As an example, an assembly may be characterized by features that determine how many degrees an outer race may rotate (e.g., clockwise and counter-clockwise). As an example, a locating washer may rotate in a recess a self-positioning manner. For example, responsive to rotation of an outer race, a locating washer may rotate relatively freely until forces are balanced (e.g., the recess may be configured in a manner that does not impede rotation of the locating washer). In such an example, a recess may not include any "stops" or otherwise define a limit or limits as to rotation of a locating washer, for example, other than characteristics imparted via one or more dimensions to accommodate a radius of an arc portion of a locating washer with a chord segment facing an outer race where, for example, such one or more dimensions may define an axis for a locating washer about which the locating washer can rotate (e.g., a recess may be defined by a wall disposed at a radius slightly larger than a radius of an arc portion of a locating washer to position the locating washer and allow for rotation of the locating washer).

As shown in the example of FIG. 2, a bearing assembly 220 is seated in a bore 230 of the housing 210 where the bore 230 extends along a bore axis from the compressor end 201 to the turbine end 202 of the housing 210. The housing 210 includes various passages for communication of lubricant to lubricate the bearing assembly 220 and, for example, to lubricate various components that may be attached to or positioned adjacent to the compressor end 201 of housing 210.

At the compressor end 201, the housing 210 includes an annular face 212 surrounding a recessed surface 214, which includes a lubricant opening 213 for communication of lubricant to the compressor end 201 of the housing 210, openings 215 for bolts or other attachment mechanism (e.g., for attachment of a compressor back plate or other component to the housing 210) and a lubricant drainage recess 217 that leads to a lubricant drain 218. As shown, the bore 230 forms an opening in the recessed surface 214 that, along a lower portion, extends to the lubricant drainage recess 217. With the bearing assembly 220 positioned in the bore 230, lubricant may flow within the bearing assembly 220 and about the bearing assembly 220 and the bore 230 and, for example, to the lubricant drainage recess 217 and to the lubricant drain 218. Lubricant may be pressurized and provided to the housing assembly 200, for example, via a conduit in fluid communication with a lubricant pump (e.g., an oil pump).

In the example of FIG. 2, the housing 210 includes a recess 240 for seating a locating washer 250 which can interact with an outer race 222 of the bearing assembly 220 as positioned in the bore 230 of the housing 210. The recess 240 is positioned to one side of the bore 230 where it may be in fluid communication with the lubricant drainage recess 217. As an example, during operation, some lubricant may flow to the recess 240 and lubricate one or more surfaces of the recess 240 and one or more surfaces of a locating washer 250 seated in the recess 240. In such a manner, the locating washer 250 may rotate with diminished frictional force (e.g., with respect to one or more surfaces of the recess 240).

Figure 3:
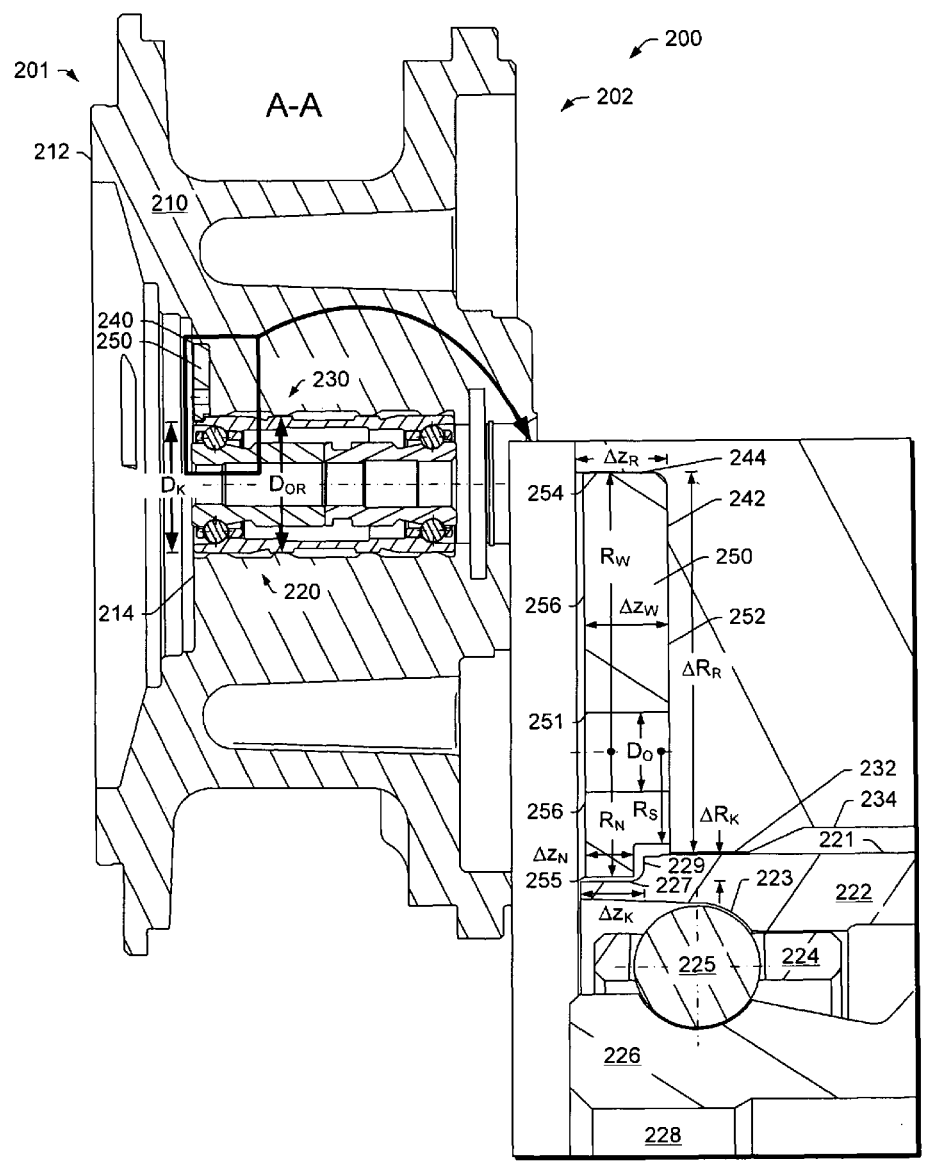
FIG. 3 is a cross-sectional view of the housing assembly of FIG. 2 along a line A-A along with an enlarged cross-sectional view.

FIG. 3 shows a cross-sectional view of the housing assembly 200 of FIG. 2 along a line A-A along with an enlarged view of a portion of the housing assembly 200. As shown in the example of FIG. 3, the bearing assembly 220 includes the outer race 222 with an outer surface 221 that extends to a keyway defined by a surface 229 and a surface 227, which may have a radiused portion therebetween. In the example of FIG. 3, the outer race 222 supports rolling elements 225 in a guide 224 (e.g., a ring with openings) where the rolling elements 225 support an inner race 226, which includes a surface 228 for mating with a surface of a shaft (not shown).

The example of FIG. 3 also shows the housing 210 as including the bore 230 with bore surfaces 232 and 234, for example, where the surface 221 of the outer race 222 forms a clearance with the bore surface 232 and a larger clearance with the bore surface 234 (e.g., for flow of lubricant). As shown, the housing 210 includes the recess 240, defined by recess walls 242 and 244. As an example, the recess wall 242 may be substantially flat and circular while the recess wall 244 may be cylindrical (e.g., a portion of a cylinder that may be defined by an arc). As an example, a radiused portion may exist between the recess walls 242 and 244.

In the example of FIG. 3, the locating washer 250 includes a bore 251 that extends between opposing flat surfaces 252 and 256 that meet at a peripheral surface 254, which may be a cylindrical surface (e.g., a portion of a cylinder that may be defined by an arc). The locating washer 250 also includes a surface 255, which may be a chord surface (e.g., a flat section cut across the coin-shaped locating washer 250 that may be defined by a chord of a circle).

Various dimensions are shown in FIG. 3 such as a keyway dimension $D_K$ of the outer race 222, an outer diameter $D_{OR}$ of the outer race 222, a radial keyway depth $\Delta R_K$ of the outer race 222 (see, e.g., the surface 229), an axial keyway length $\Delta z_K$ of the outer race 222 (see, e.g., the surface 227), a radial recess dimension $\Delta R_R$ of the recess 240, an axial recess dimension $\Delta z_R$ of the recess 240, a radial dimension $R_W$ of the locating washer 250, an axial dimension $\Delta z_W$ of the locating washer 250, a radial shoulder dimension $R_S$ of the locating washer 250, a radial notch dimension $R_N$ of the locating washer 250, an axial notch dimension $\Delta z_N$ of the locating washer 250, and a diameter $D_O$ of the bore 221 of the locating washer 250.

As an example, the radial dimension $R_W$ of the locating washer 250 may be about 7 mm, the axial dimension $\Delta z_W$ of the locating washer 250 may be about 2 mm, the radial shoulder dimension $R_S$ of the locating washer 250 may be about 2.3 mm, the radial notch dimension $R_N$ of the locating washer 250 may be about 3.1 mm and the axial notch dimension $\Delta z_N$ of the locating washer 250 may be about 1.2 mm. As an example, the diameter $D_O$ of the bore 221 of the locating washer 250 may be about 2 mm. Such a bore may act to preserve flatness of the locating washer 250, for example, in response to stress (e.g., applied, thermal, warp, etc.). As an example, one or more dimensions of the outer race 222 may be referenced to the aforementioned dimensions of the locating washer 250; noting that two cylindrical coordinate systems may be used to define various features of the assembly 200. As an example, the outer race 222 may have an outer diameter $D_{OR}$ of about 18 mm and a keyway dimension $D_K$ of about 17.3 mm.

As an example, a locating washer such as the locating washer 250 may be treated. For example, a locating washer may be subject to a nitriding process to provide a nitrided locating washer. As an example, a portion of a locating washer may be nitrided or subject to another type of process. For example, a laser treatment process may be used to treat a surface of a locating washer that may come into contact with a portion of an outer race of a bearing assembly. As an example, a treatment may increase hardness of at least a portion of a locating washer. As an example, a locating washer may be made of a metal or alloy.

Figure 4:
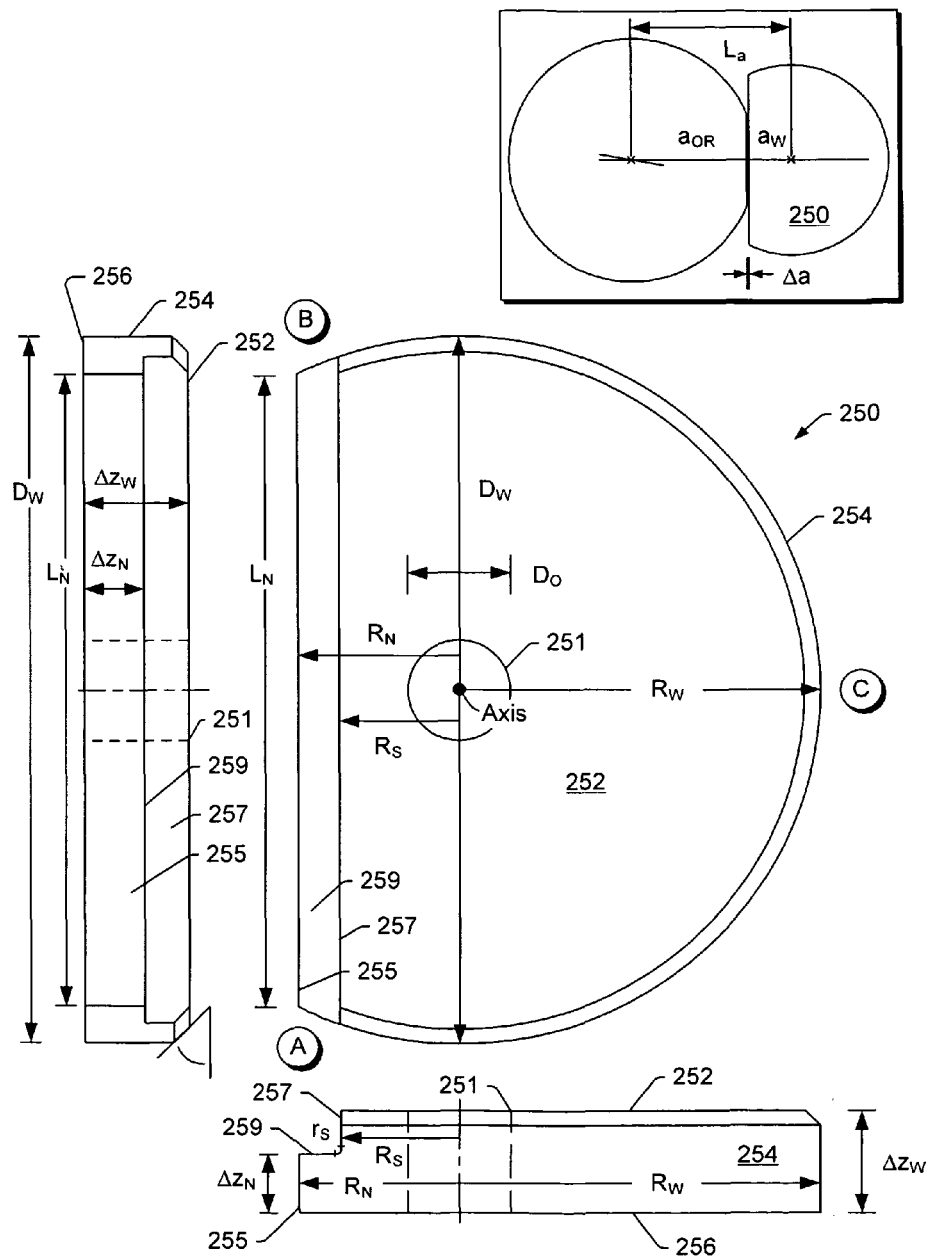
FIG. 4 is a series of views of an example of a locating washer.

FIG. 4 shows various views of the locating washer 250 along with various dimensions (e.g., which may be defined with respect to a cylindrical coordinate system). FIG. 4 also shows, in an inset, various dimensions with respect to, for example, an outer race of a bearing assembly (e.g., consider two cylindrical coordinate systems, one for an outer race and one for a locating washer). Specifically, in the inset, a dimension $L_a$ is defined as the sum of an apothem $a_{OR}$ of an outer race, an apothem $a_W$ of a locating washer and a clearance of gap $\Delta a$. Given such a clearance or gap, an outer race and a locating washer can rotate and form a contact along their respective flat, chord portions (e.g., chord segments). As such a contact is formed over a length, force may be distributed over a surface area defined in part by the length, which, in turn, may diminish wear, damage, etc.

As to a circular portion of a locating washer (e.g., an arcuate portion defined by a chord cutting across a circle to form an arc), it can provide for rotation in a recess as well as provide for transfer of force (e.g., from contact along a chord segment) to a structure that defines the recess (e.g., a housing having a circular wall that defines at least a portion of the recess). In the example of FIG. 4, a perimeter of the locating washer 250 may include a chord segment from A to B and a major arc from A to C to B, for example, defined by ends of the chord segment. In such an example, the chord segment from A to B may be defined by an apothem measured from an axis of the locating washer 250 and the major arc may be defined by a radius measured from the axis. As an example, depending on configuration as to a chord segment clipping a circular locating washer, an arc may be a minor arc or, for example, an arc of a semicircle.

As an example, where an outer race includes an outer diameter of about 18 mm, a locating washer may include an outer diameter of about 14 mm (e.g., for a major arc of a perimeter of the locating washer). In such an example, the locating washer may be about 2 mm thick and include a bore of about 2 mm in diameter, for example, to help warranty flatness of the locating washer. Referring again to the example of FIG. 3, particularly, the enlarged cross-sectional view, the chord portion of the outer race 222 (e.g., defined by surface 227) may be selected to avoid interference with a contour 223 for supporting the rolling elements 225 while maintaining material to form an end surface (not labeled) at the compressor end of the outer race 222. As an example, the chord portion of the outer race 222 may be made to be longer where a surface such as the surface 227 is maintained with sufficient strength for contacting and distributing force to a locating washer. Accordingly, the length of a chord portion or keyway portion of an outer race may be determined, at least in part, by a thickness of the outer race. As an example, a chord portion may be referred to as a chord segment, for example, having a length that may be defined by an angle about an axis of an outer race (e.g., or a locating washer). As an example, an outer race can have an axis and a perimeter that includes a chord segment, for example, defined by an apothem measured from the axis.

Figure 5:
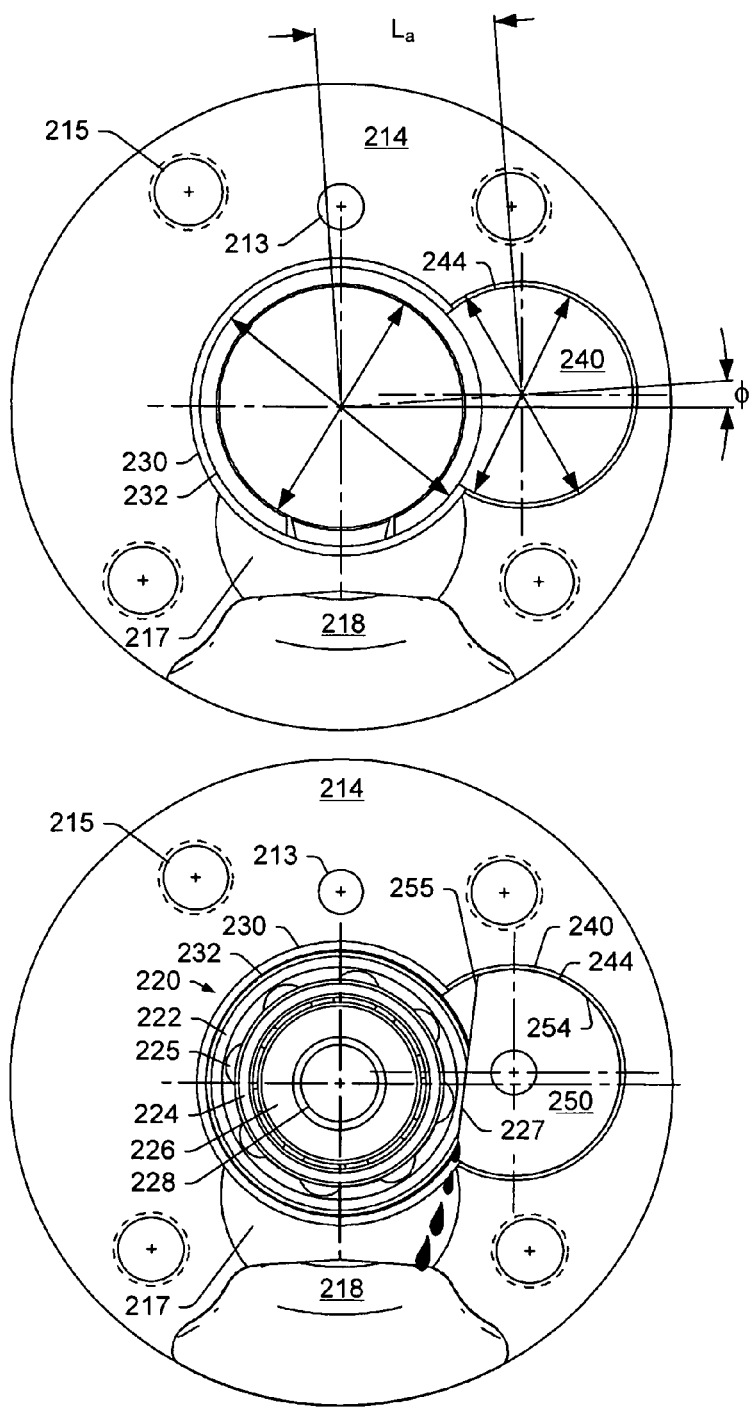
FIG. 5 is an end view of an example of a housing and an end view of the housing assembly of FIG. 2.

FIG. 5 shows an end view of a portion of the housing 210 and an end view of a portion of the assembly 200. As shown in the example of FIG. 5, the distance between the axes of the bore 230 and the recess 240 may be defined as $L_a$. For example, where the bore 230 has a diameter of about 18 mm and the recess has a diameter of about 14 mm, the distance $L_a$ may be about 11.6 mm. In such an example, the axis of the recess 240 may be offset by an angle of about 4 degrees with respect to a horizon across the axis of the bore 230. As an example, the recess 240 may be referred to as a circular recess defined by a wall disposed at a radius slightly larger than that of a major arc of a perimeter of a locating washer to allow for rotation of the locating washer in the recess as well as contact between the perimeter of the locating washer and the wall (e.g., for transfer of force). As an example, a locating washer may include a through bore, which may be centered on a rotational axis of the locating washer. In such an example, as well as various other examples, a locating washer does not include a shaft and can rotate relatively freely in a recess to distribute force to a wall that defines the recess. In examples where a locating washer does not include a shaft (e.g., consider a relatively flat locating washer), a recess need not include any type of shaft bore. As an example, a recess may be formed by drilling into a housing (e.g., to form a substantially circular recess).

In the example of FIG. 5, as shown by droplets, during operation, lubricant may lubricate the surfaces 227 and 255, for example, to allow for sliding and positioning of the locating washer 250 in the recess (e.g., by rotation). Upon contact along a surface (e.g., having surface area to distribute force), lubricant between the surfaces 227 and 255 may be squeezed out and migrate (e.g., under gravity) to the lubricant drain recess 217 and to the lubricant drain 218. As an example, lubricant may lubricate various surfaces of a recess and a locating washer, for example, to reduce sliding frictional force (e.g., to allow a locating washer to achieve a static "balanced" position in a recess for transfer of force to a housing).

Figure 6:
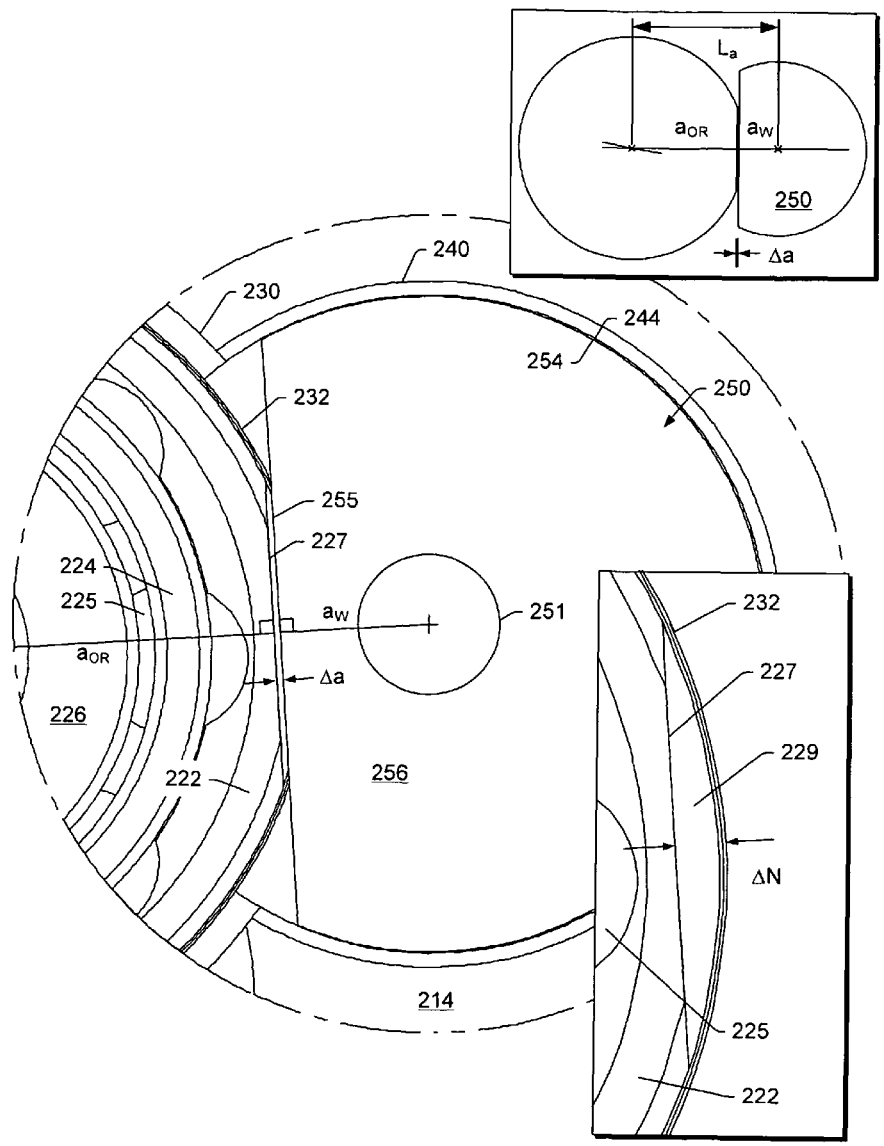
FIG. 6 is an enlarged end view of a portion of the housing assembly of FIG. 2.

FIG. 6 shows a view of a portion of the outer race 222 in the bore 230 and the locating washer 250 in the recess 240 along with an enlarged view of a portion of the outer race 222. As shown in the enlarged view of the outer race 222, a dimension $\Delta N$ represents a sagitta, for example, as defined by the apothem $a_{OR}$ for a chord formed by the surface 227. As shown, the sagitta is selected to generate a sufficient chord length (e.g., a chord segment) for the surface 227. Such a sagitta may have a maximum defined by a radial thickness of an outer race. As an example, a sagitta dimension is selected to provide sufficient surface area for contacting a locating washer, for example, for purposes of transferring stress (e.g., without causing deformation of the outer race, etc.). Accordingly, too small of a surface area can result in increased mechanical stress; whereas, radial thickness of an outer race can limit how large a surface area may be (e.g., where radial thickness of an outer race may depend on various characteristics of a bearing assembly). As an example, a surface area for contact between an outer race and a locating washer may be of the order of about 4 mm$^2$ (e.g., for an outer race with a diameter of about 18 mm).

Figure 7:
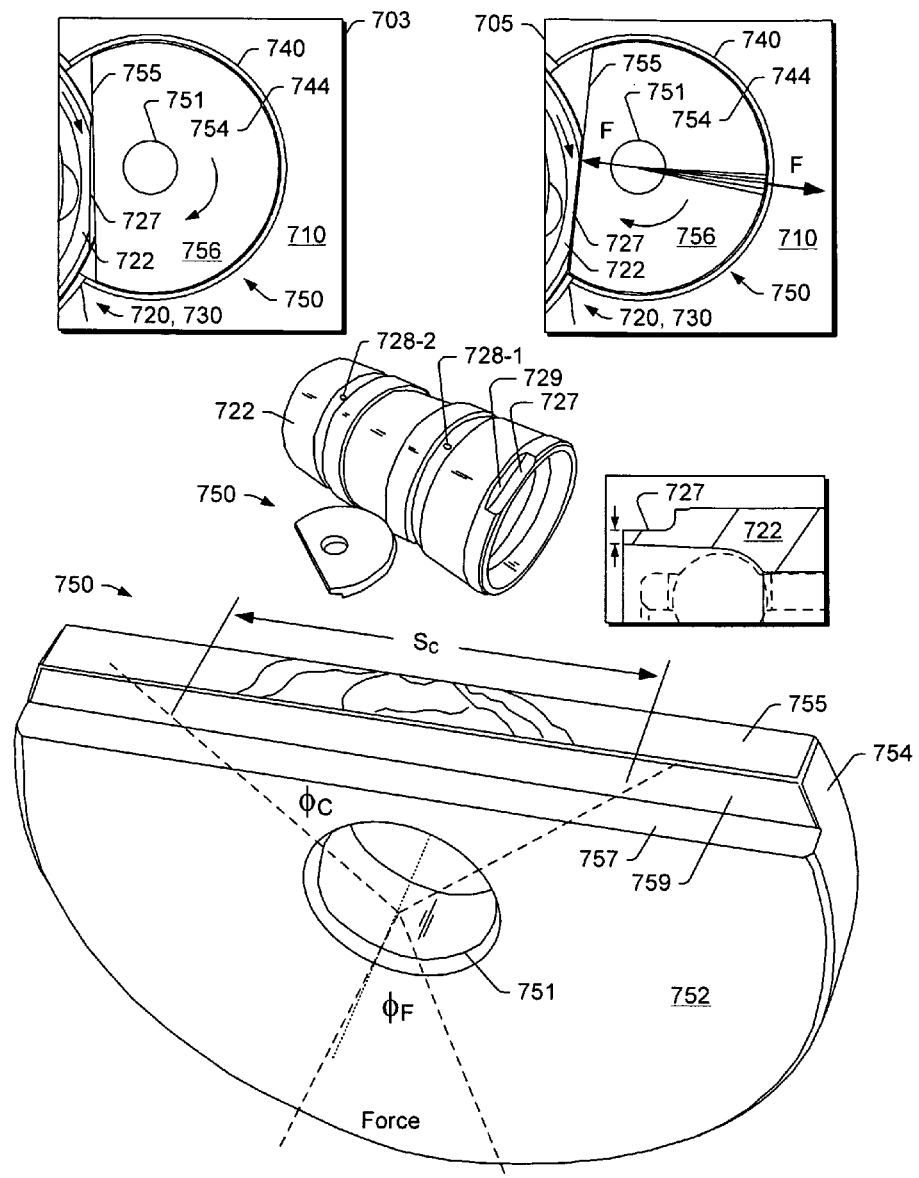
FIG. 7 is a series of views of an example of a locating washer and an example of an outer race for a bearing assembly.

FIG. 7 shows a series of diagrams associated with a trial performed using a locating washer 750 in a recess 740 of a housing 710 for locating an outer race 722 of a bearing assembly 720 in a bore 730 of the housing 710. In a diagram 703, clockwise rotation of the outer race 722 causes contact between the outer race 722 and the locating washer 750 along surfaces 727 and 755. As a clearance or gap can exist between the surfaces 727 and 755 in a non-contact state, contact of these surfaces can cause rotation of the locating washer 750 in a clockwise manner for clockwise rotation of the outer race 722. As shown in the diagram 705, upon rotation of the locating washer 750, a static position is reached where force is distributed from a contact region between the surfaces 727 and 755 through the locating washer 750 to the housing 710 (e.g., via a wall 744 of the recess 740). In the diagrams 703 and 705, also labeled are a bore 751 of the locating washer 750 and surfaces 754 and 756 of the locating washer 750.

In FIG. 7, a perspective view of the outer race 722 is shown along with the locating washer 750 where the outer race 722 includes lubricant openings 728-1 and 728-2 to direct lubricant to, for example, rolling elements disposed within the outer race 722. Also shown are the surfaces 727 and 729. In a cross-sectional view of the outer race 722, a radial thickness is shown, as determined by the depth or a sagitta for the surface 727.

In FIG. 7, a perspective view of the locating washer 750 is shown as including surfaces 752, 754, 755, 757 and 759. In FIG. 7, the surfaces 754 and 755 are perimeter surfaces of the locating washer 750, for example, where the surface 754 may be defined by a major arc and the surface 755 may be defined by a chord segment. An angle labeled $\phi_C$ corresponds to a region of the surface 755 where contact occurred with an outer race for a trial where the locating washer 750 was nitrided. Another angle $\phi_F$ corresponds to a region of the surface 754 where force may be distributed for such contact to a wall of a recess of a housing (see, e.g., the wall 744 of the recess 740 of the housing 710).

In the example of FIG. 7, the arrangement of the various components can act to reduce powerloss and frictional contact, which can increase efficiency. As to limiting rotation of an outer race of a bearing assembly, this may be performed for purposes of vibration damping. As described with respect to FIG. 7, a locating washer may be self-positioning where its contact surface is optimized via its rotation to improve durability.

As to a bearing assembly that includes rolling elements, an outer race may be made from metal or alloy of sufficient hardness. As an example, an outer race may be hardened stainless steel. In contrast, consider a unitary journal bearing manufactured from a softer metal such as brass. As explained with respect to the example of FIG. 7, given the hardness of an outer race, a locating mechanism may be nitrided or otherwise treated to increase its hardness. Further, by configuring components to allow for self-positioning of a locating washer (e.g., in response to rotation of an outer race), contact may be formed along an area of sufficient size to distribute force and reduce stress.

As an example, an assembly may include a locating washer configured as a flat coin with a clipped portion and optionally a hole or holes therethrough. A circular perimeter along a portion that sits in a recess can allow for rotation where force is distributed from the circular perimeter to the recess over an area, rather than at a corner or other "pinch" point (e.g., a stop point). As such a locating washer may be configured without a shaft (e.g., a post, etc.), it can makes stack up more accurate between the locating washer and outer race of a bearing assembly (e.g., which can be beneficial for a bearing assembly having an outer race of minimal radial thickness.

As an example, thickness of a locating washer, diameter, apothem (or sagitta), chord length (e.g., chord segment), etc., may be selected for purposes of defining contact area for contacting an outer race of a bearing assembly, for example, in conjunction with diameter, apothem (or sagitta), chord length (e.g., chord segment), etc., of the outer race and clearance or gap between the contact surfaces (e.g., gap between apothems). While various examples of a locating washer include a shoulder or step portion (see, e.g., surfaces 757 and 759 of the locating washer 750 of FIG. 7), as an example, a locating washer may be of relatively uniform thickness and flat (e.g., without a shoulder or step). As an example, a shoulder or step portion may be included based on consideration of one or more features of an outer race of a bearing assembly. As an example, referring to FIG. 7, where the surface 727 of the outer race 722 has a sufficiently long axial length, a locating washer may be provided without a shoulder or step (e.g., without the surfaces 757 and 759). As an example, where a shoulder or step is included, a locating washer may be selected to have a thickness or thicknesses that provide for sufficient contact area with an outer race of a bearing assembly and for sufficient contact area with a wall of a recess that seats the locating washer. Further, thickness of a locating washer may be selected to ensure flatness under stress, for example, over a range of operational temperatures and stresses.

As an example, a recess of a housing to seat a locating washer may be sufficiently deep (e.g., axial depth) such that axial thrust force carried by an outer race of a bearing assembly does not apply force to the locating washer that could force it up against another component (e.g., to carry and transfer the axial thrust force). In such an example, depending on configuration of the outer race, a locating washer may be essentially free from axial thrust forces carried by an outer race (see, e.g., dimensions of the recess 240, the locating washer 250 and the outer race 222 of FIG. 2).

Figure 8:
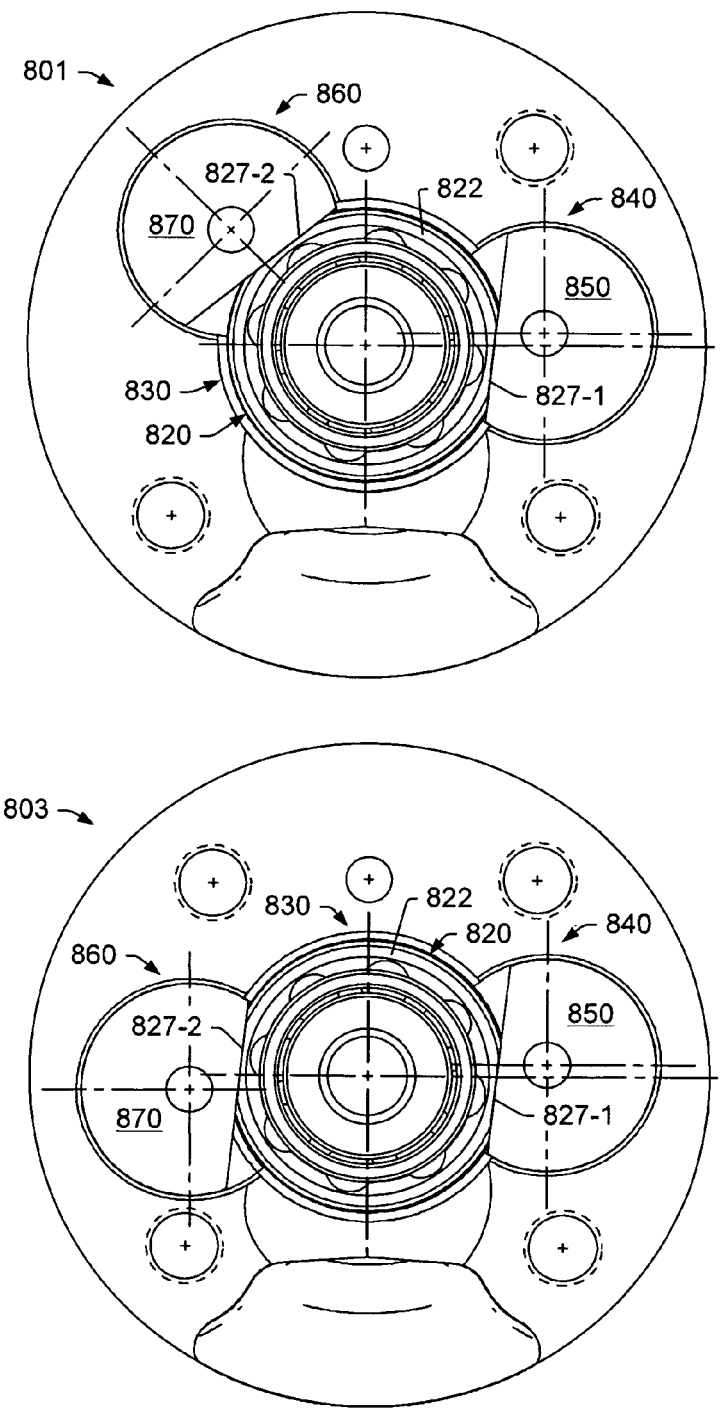
FIG. 8 is a series of views of examples of assemblies with a plurality of locating washers.

FIG. 8 shows a view of an example of an assembly 801 and a view of an example of an assembly 803. In the assembly 801 and the assembly 803, a plurality of locating washers 850 and 870 are shown as being disposed in respective recesses 840 and 860. Further, a bearing assembly 820 is shown as being disposed in a bore 830 where the bearing assembly 820 includes an outer race 822 with two chord segments 827-1 and 827-2. As shown, the chord segment 827-1 can contact the locating washer 850 and the chord segment 827-2 can contact the locating washer 870. As an example, an assembly that includes a plurality of locating washers may distribute force in a manner that acts to diminish wear, hammering of components, etc. In the examples of FIG. 8, certain angular displacements are shown between respective axes of the locating washers 850 and 870; as an example, an assembly may include another angular displacement between two locating washers.

Figure 9:
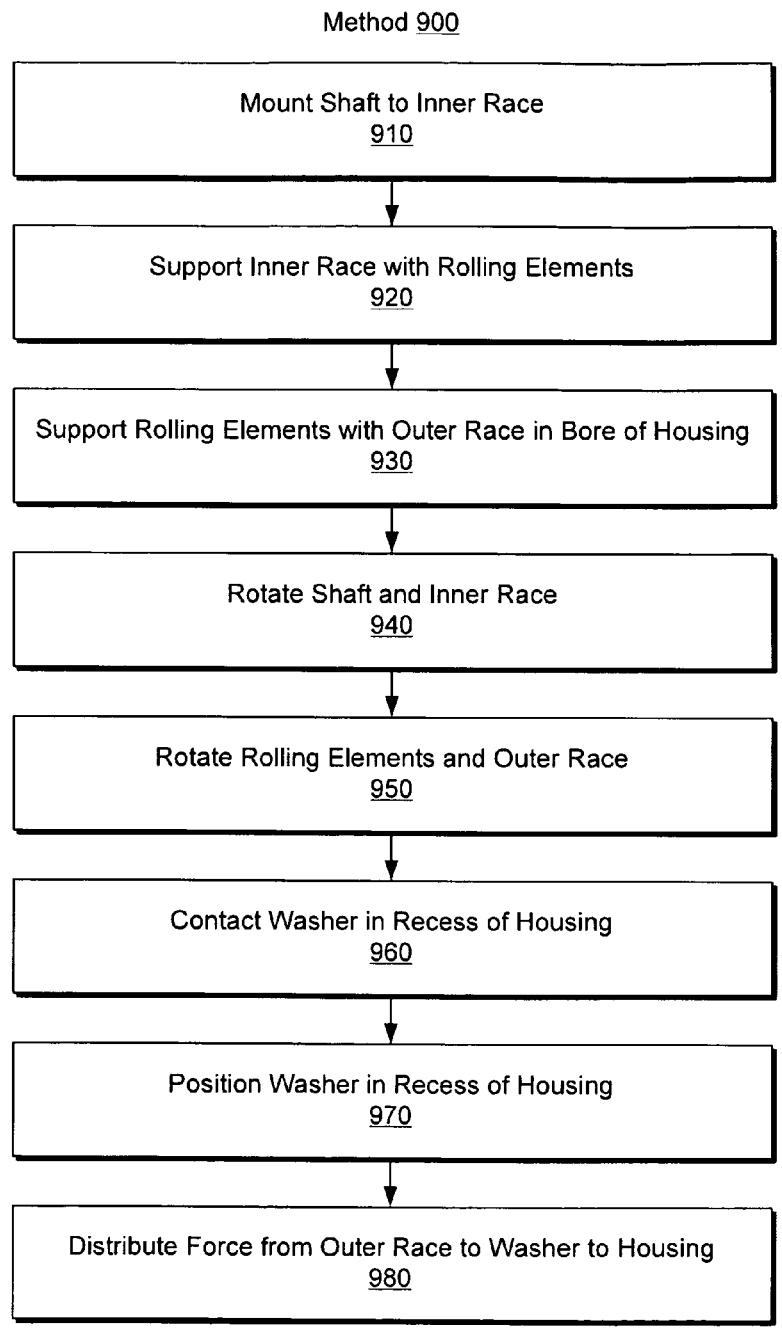
FIG. 9 is a block diagram of an example of a method.

FIG. 9 shows a block diagram of an example of a method 900. As shown in the example of FIG. 9, the method 900 includes a mount block 910 for mounting a shaft to an inner race, a support block 920 for supporting the inner race with rolling elements, a support block for supporting the rolling elements with an outer race in a bore of a housing, a rotate block 940 for rotating the shaft, a rotate block 950 for rotating the rolling elements and the outer race (e.g., by transfer of force), a contact block 960 for contacting a locating washer in a recess of the housing with the outer race, a position block 970 for positioning the locating washer in the recess of the housing responsive to the contacting, and a distribution block 980 for distributing force from the outer race to the locating washer in the recess of the housing to the housing.

As an example, an assembly for a turbocharger can include a locating washer having an axis and a perimeter that includes a chord segment defined by an apothem measured from the axis and a major arc defined by ends of the chord segment and a radius measured from the axis; a bearing assembly that includes an outer race having an axis and a perimeter that includes a chord segment defined by an apothem measured from the axis; and a housing that includes a bore for receipt of the bearing assembly and a recess for receipt of the locating washer to space apart the axes of the locating washer and the outer race by a distance greater than the sum of the apothems that provides for contact between the chord segments upon rotation of at least one of the locating washer in the recess and the outer race in the bore. In such an example, the locating washer can include a bore, for example, centered on the axis of the locating washer.

As an example, a bearing assembly can include rolling elements, which may be in contact with an inner race, which may be a shaft, one or more components mounted to a shaft, etc.

As an example, a chord segment of a locating washer can include an area defined in part by an axial thickness of the locating washer. As an example, a chord segment of an outer race can include an area defined in part by an axial length along the outer race.

As an example, a recess of a housing may be a compressor end recess and a chord segment of an outer race may be a compressor end chord segment.

As an example, a locating washer can include a shoulder disposed adjacent to the chord segment. As an example, a locating washer may be a nitrided locating washer. As an example, an outer race may be a stainless steel outer race.

As an example, a housing can include a lubricant inlet for lubricant to directly or indirectly lubricate a locating washer in a recess of the housing. As an example, a locating washer can rotate clockwise to limit clockwise rotation of an outer race and the locating washer can rotate counter-clockwise to limit counter-clockwise rotation of the outer race. As an example, a distance greater than the sum of an apothem of a chord segment of a locating washer and an apothem of a chord segment of an outer race can define, in part, limits on clockwise and counter-clockwise rotation of an outer race by the locating washer.

As an example, a turbocharger can include a compressor wheel disposed in a compressor housing; a turbine wheel disposed in a turbine housing; a shaft extending between the turbine wheel and the compressor wheel; a locating washer having an axis and a perimeter that includes a chord segment defined by an apothem measured from the axis and a major arc defined by ends of the chord segment and a radius measured from the axis; a bearing assembly that includes rolling elements for rotational support of the shaft and an outer race having an axis and a perimeter that includes a chord segment defined by an apothem measured from the axis; and a center housing disposed between the compressor housing and the turbine housing where the center housing includes a bore for receipt of the bearing assembly and a recess for receipt of the locating washer to space apart the axes of the locating washer and the outer race by a distance greater than the sum of the apothems that provides for contact between the chord segments upon rotation of at least one of the locating washer in the recess and the outer race in the bore. In such an example, the locating washer can rotate clockwise in the recess to limit clockwise rotation of the outer race and the locating washer can rotate counter-clockwise in the recess to limit counter-clockwise rotation of the outer race. As an example, the aforementioned distance can define, in part, limits on clockwise and counter-clockwise rotation of the outer race.

As an example, a method can include operating a turbocharger that includes a shaft extending between a turbine wheel and a compressor wheel, the shaft supported by a bearing assembly that includes an outer race having an axis and a perimeter that includes a chord segment defined by an apothem measured from the axis, the outer race disposed in a bore of a housing that includes a recess that seats a locating washer having an axis and a perimeter that includes a chord segment defined by an apothem measured from the axis and a major arc defined by ends of the chord segment and a radius measured from the axis; rotating the outer race clockwise or counter-clockwise in the recess; responsive to the rotating, contacting the chord segment of the perimeter of the outer race and the chord segment of the perimeter of the locating washer; and, responsive to the rotating and the contacting, rotating the locating washer clockwise or counter-clockwise to achieve a static position of the locating washer in the recess that limits the rotating of the outer race. Such a method may further include rotating the outer race in an opposite direction and, for example, responsive to the rotating in an opposite direction, contacting the chord segment of the perimeter of the outer race and the chord segment of the perimeter of the locating washer and, responsive to the rotating in the opposite direction and the contacting, rotating the locating washer in the recess to achieve a static position of the locating washer in the recess that limits the rotating in the opposite direction of the outer race.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly for a turbocharger, the assembly comprising:
   a locating washer having an axis and a perimeter that comprises a chord segment defined by an apothem measured from the axis, a major arc defined by ends of the chord segment and a radius measured from the axis, and a chord segment surface defined in part by the chord segment and in part by at least a portion of an axial thickness of the locating washer;
   a bearing assembly that comprises rolling elements that contact an outer race having an axis and a perimeter that comprises a chord segment defined by an apothem measured from the axis, and a chord segment surface defined in part by the chord segment and in part by a portion of an axial length along the outer race; and
   a housing that comprises a bore that receives the bearing assembly and a recess that receives the locating washer to space apart the axes of the locating washer and the outer race by a distance that is greater than a sum of the apothems to define a gap distance wherein the gap distance defines in part rotational limits for the outer race and the locating washer and wherein at each of the rotational limits contact exists between a length of the chord segment surface of the locating washer and a length of the chord segment surface of the outer race.

2. The assembly of claim 1 wherein the locating washer comprises a bore.

3. The assembly of claim 2 wherein the bore of the locating washer is centered on the axis of the locating washer.

4. The assembly of claim 1 wherein the bearing assembly comprises an inner race that contacts the rolling elements.

5. The assembly of claim 1 wherein the recess comprises a compressor end recess.

6. The assembly of claim 1 wherein the chord segment of the perimeter of the outer race comprises a compressor end chord segment.

7. The assembly of claim 1 wherein the locating washer comprises a shoulder disposed adjacent to the chord segment surface.

8. The assembly of claim 1 wherein the locating washer comprises a nitrided locating washer.

9. The assembly of claim 1 wherein the outer race comprises a stainless steel outer race.

10. The assembly of claim 1 wherein the housing comprises a lubricant inlet for lubricant to directly or indirectly lubricate the locating washer in the recess.

11. The assembly of claim 1 wherein the locating washer rotates clockwise in the recess to limit clockwise rotation of the outer race and wherein the locating washer rotates counter-clockwise in the recess to limit counter-clockwise rotation of the outer race.

12. The assembly of claim 1 wherein the gap distance defines, in part, limits on clockwise and counter-clockwise rotation of the outer race.

13. A turbocharger comprising:
    a compressor wheel disposed in a compressor housing;
    a turbine wheel disposed in a turbine housing;
    a shaft extending between the turbine wheel and the compressor wheel;
    a locating washer having an axis and a perimeter that comprises a chord segment defined by an apothem measured from the axis, a major arc defined by ends of the chord segment and a radius measured from the axis, and a chord segment surface defined in part by the chord segment and in part by at least a portion of an axial thickness of the locating washer;
    a bearing assembly that comprises rolling elements that rotatably support of the shaft and an outer race having an axis and a perimeter that comprises a chord segment defined by an apothem measured from the axis, and a chord segment surface defined in part by the chord segment and in part by a portion of an axial length along the outer race; and
    a center housing disposed between the compressor housing and the turbine housing wherein the center housing comprises a bore that receives the bearing assembly and a recess that receives the locating washer to space apart the axes of the locating washer and the outer race by a distance that is greater than a sum of the apothems to define a gap distance wherein the gap distance defines in part rotational limits for the outer race and the locating washer and wherein at each of the rotational limits contact exists between a length of the chord segment surface of the locating washer and a length of the chord segment surface of the outer race.

14. The turbocharger of claim 13 wherein the locating washer rotates clockwise in the recess to limit clockwise rotation of the outer race and wherein the locating washer rotates counter-clockwise in the recess to limit counter-clockwise rotation of the outer race.

15. The turbocharger of claim 13 wherein the gap distance defines, in part, limits on clockwise and counter-clockwise rotation of the outer race.

16. A method comprising:
    operating a turbocharger that comprises a shaft extending between a turbine wheel and a compressor wheel, the shaft supported by a bearing assembly that comprises rolling elements that contact an outer race having an axis and a perimeter that comprises a chord segment defined by an apothem measured from the axis, the outer race disposed in a bore of a housing that comprises a recess that seats a locating washer having an axis and a perimeter that comprises a chord segment defined by an apothem measured from the axis and a major arc defined by ends of the chord segment and a radius measured from the axis;
    rotating the outer race clockwise or counter-clockwise;
    responsive to the rotating, contacting a length of the chord segment of the perimeter of the outer race and a length of the chord segment of the perimeter of the locating washer; and
    responsive to the rotating and the contacting, rotating the locating washer clockwise or counter-clockwise in the recess to achieve a static position of the locating washer that limits the rotating of the outer race.

17. The method of claim 16 further comprising rotating the outer race in an opposite direction.

18. The method of claim 17 further comprising responsive to the rotating in an opposite direction, contacting a length of the chord segment of the perimeter of the outer race and a length of the chord segment of the perimeter of the locating washer and, responsive to the rotating in the opposite direction and the contacting, rotating the locating washer in the recess to achieve a static position of the locating washer that limits the rotating in the opposite direction of the outer race.

* * * * *